United States Patent

Hayes

[15] 3,655,164
[45] Apr. 11, 1972

[54] NOZZLE COUPLING

[72] Inventor: Jerry R. Hayes, Peoria, Ill.

[73] Assignee: L. R. Nelson Mfg. Co., Inc., Peoria, Ill.

[22] Filed: Feb. 3, 1970

[21] Appl. No.: 8,385

[52] U.S. Cl. ..........................................251/347
[51] Int. Cl. ..........................................F16k 31/44
[58] Field of Search ........................251/347, 340

[56] References Cited

UNITED STATES PATENTS

| | | | |
|---|---|---|---|
| 2,245,097 | 6/1941 | Tobler | 251/340 |
| 2,502,301 | 3/1950 | Alderfer | 251/340 X |
| 2,556,583 | 6/1951 | Hinz | 251/340 X |
| 2,600,976 | 6/1952 | Dalrymple | 251/347 |
| 2,985,425 | 5/1961 | Tang | 251/340 |
| 3,093,155 | 6/1963 | Davies | 251/340 X |
| 3,367,626 | 2/1968 | Stern | 251/340 |
| 3,374,985 | 3/1968 | Gressic | 251/347 X |
| 3,394,917 | 7/1968 | Miscovich | 251/347 |
| 3,525,361 | 8/1970 | Cerbin et al. | 137/614.04 |
| 3,527,441 | 9/1970 | Fisher | 251/347 |

*Primary Examiner*—Samuel Scott
*Attorney*—Cushman, Darby & Cushman

[57] ABSTRACT

A nozzle coupling adapted for connection to a hose and provided with a rigid, tubular housing and a spray diffuser and valve element adapted to be longitudinally moved within the housing by the rotation of a tube member also mounted within the tubular housing and engaging the spray and diffuser element. The spray and diffuser element moves from a substantially open position providing minimum flow restriction for fluid passing through the coupling to a closed position sealing the coupling. A spray of varying character results between the two positions. A swivel-mounted, tubular, male coupling member is provided adjacent the coupling exit for connection to another sprinkler or other device.

7 Claims, 5 Drawing Figures

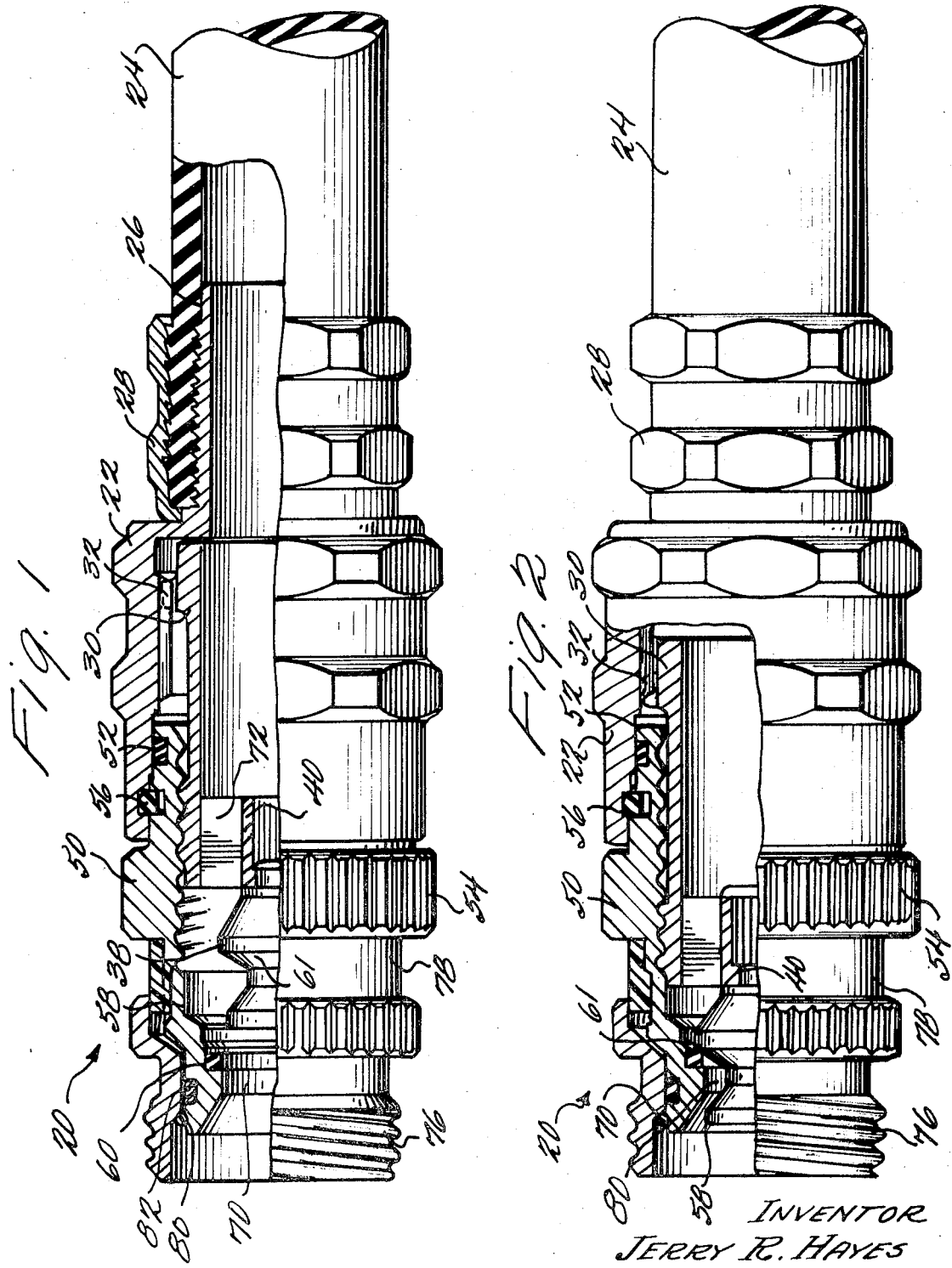

Patented April 11, 1972
3,655,164
2 Sheets-Sheet 2
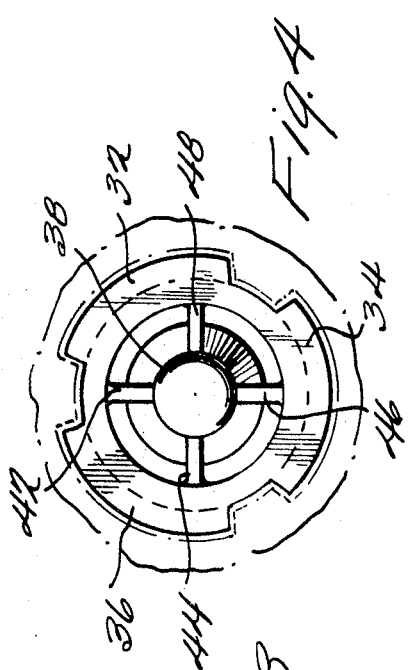
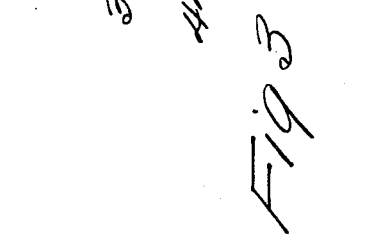
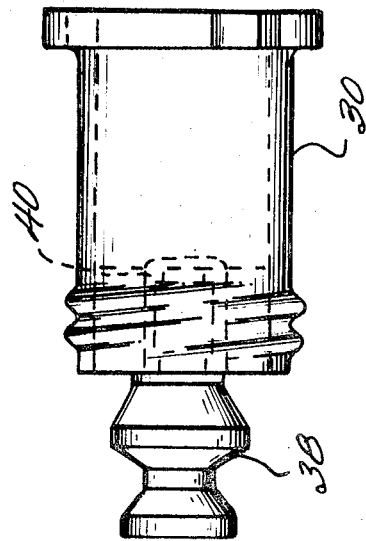
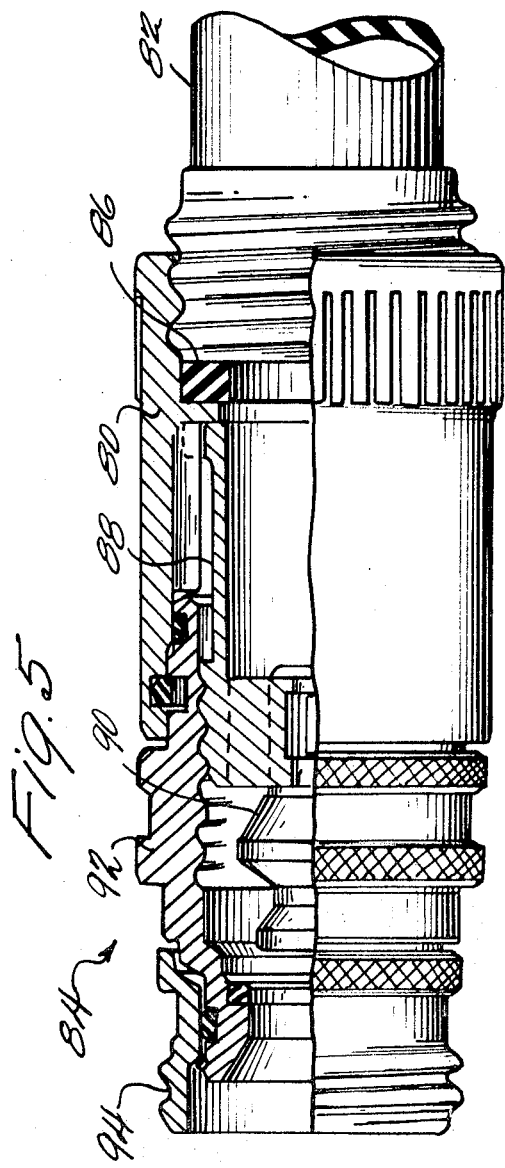
INVENTOR
JERRY R. HAYES
BY
Cushman, Darby & Cushman
ATTORNEYS

NOZZLE COUPLING

BRIEF DESCRIPTION OF THE PRIOR ART AND SUMMARY OF THE INVENTION

The invention relates to a nozzle coupling for providing in an open position minimum flow restriction between a hose and a device attached to a male end of the coupling and for operating as a nozzle in other positions.

Frequently, when a conventional nozzle or other sprinkler is used to distribute water from a hose to a given area, it is necessary to remove the sprinkler or nozzle and replace it with another device which is more suitable to the task at hand or a new task. To avoid the rush of water which will result if the nozzle or sprinkler is simply removed from the end of the hose, it is necessary either to kink the hose or to go and shut off the supply of water at some distant point. Both of these procedures are unwieldy, time consuming, and generally unsatisfactory. Further, a substantial amount of wasted time is thereafter required to remove the existing nozzle or sprayer and replace it with the new one.

However, if the nozzle which is being used to distribute water is provided with a male coupling member at its nozzle end, then the new sprinkler, nozzle or other device can be simply connected to that male coupling member in the same fashion as it connects to a hose. Accordingly, there is no necessity to physically remove the nozzle, which thus serves as both a coupling member and a nozzle. Further, since the nozzle can be used to temporarily cut off the flow of fluid while the new nozzle or sprinkler is being attached, there is no necessity to kink the hose or to shut off the flow of water at some distant point, and considerable time and efforts are thereby saved. Two such coupling nozzles are described in the U.S. Pats. to Scheiwer, No. 2,568,515, and Bersted, No. 1,917,216.

However, nozzles such as described in these patents have been found to be unsatisfactory in that the flow of water through the nozzle is too restricted even when the nozzle is opened to its greatest extent, to deliver satisfactory amounts of water to many types of attached devices. The present invention relates to a novel nozzle coupling whereby flow restriction through the nozzle, when the nozzle is in its open position, is reduced to a minimum.

In the embodiment of the invention described below, this novel nozzle coupling includes a rigid, tubular housing having an attachment means at one end thereof for either permanent or temporary connection to a hose which carries water or other fluid from its source to the nozzle coupling. A tubular member includes a sleeve which extends into this rigid, tubular housing and the opposite end of this sleeve is fixedly secured, for example, by a plurality of circumferentially spaced, radially extending ribs, to a spray diffuser and valve element which extends axially outwardly from the sleeve. One or more interior longitudinally extending tabs are formed on one end of the sleeve and these tabs are adapted for longitudinal movement in corresponding grooves in the rigid, tubular housing. A rotational member is sealingly engaged within the rigid, tubular housing and is provided with interior threads which cooperate with exterior threads on the sleeve so that, when the rotational member is manually rotated, the spray diffuser and valve element moves longitudinally in response thereto to vary the flow of water out the nozzle end of the coupling. Swivelly mounted on the exterior end of the rotatable member is a tubular male hose coupling member for connection to another nozzle, sprayer or similar device. Thus, in its open position, the sprayer diffuser and valve element provides minimum restriction to the flow of fluid through the nozzle coupling and into another nozzle or sprinkler attached to the male hose coupling member.

Many other objects and purposes of the invention will become clear from the following detailed description of the drawings.

BRIEF DESCRIPTION OF THE DRAWINGS

FIG. 1 shows the novel nozzle coupling of this invention in its open position with a portion of the exterior cut away;

FIG. 2 shows the nozzle coupling of FIG. 1 in its closed position;

FIG. 3 shows a side view of the spray diffuser and valve element and tubular sleeve member;

FIG. 4 shows an end view of the diffuser and valve element and sleeve member of FIG. 3;

FIG. 5 shows a variation of the embodiment of FIG. 1 wherein the nozzle coupling is adapted for simple removal from the associated hose.

DETAILED DESCRIPTION OF THE DRAWINGS

Reference is now made to FIGS. 1 and 2 which show one embodiment of the above invention whereby the illustrated nozzle coupling 20 has an open position providing minimum restriction to the flow of fluid through the coupling and other positions varying the flow of water through the nozzle and diffusing it. As mentioned briefly above, a tubular, rigid housing member 22 is coupled to a conventional hose 24 which links nozzle coupling 20 to a suitable source of fluid such as water. In FIGS. 1 and 2, rigid housing member 22 is provided with a threaded or annular serrated, outwardly extending male portion 26 which engages within hose 24 to connect coupling 20 to hose 24 as shown. A tubular retaining member 28 is also provided with interior threads or annular serrations which engage hose 24 and thus members 28 and 26 serve to prevent rigid housing member 22 from becoming inadvertently disconnected from hose 24.

A tubular member 30 is mounted within rigid housing 22 and, as can be seen in FIG. 4, member 30 includes a sleeve which extends axially into member 22 at one end and is provided at that end with a plurality of exterior, longitudinally extending tabs, which each ride in a corresponding groove on the interior of rigid housing member 22. In the embodiment of the invention shown in FIGS. 1–4, three such tabs 32, 34 and 36 are provided, and these tabs, while permitting longitudinal movement of member 30, prevent rotation of member 30 with respect to rigid housing member 22.

The end of the sleeve of member 30 opposite from tabs 32, 34 and 36 is fixedly secured in any suitable fashion to a spray diffuser and valve element 38 which can be seen clearly in FIG. 3. In the embodiment illustrated in FIGS. 1–4, four circumferentially spaced, radially extending ribs 42, 44, 46 and 48 connect the cylindrical exterior surface of the member 30 to a central cylindrical member 40. One end of the spray diffuser and valve element 38 extends through cylindrical member 40 as shown and is held in place by any suitable means. Thus, as member 30 moves longitudinally, spray diffuser and valve element 38 moves with it. The four ribs 42, 44, 46 and 48 are together conventionally referred to as a spider, and the open spaces between these ribs through which the water flows is frequently termed the spider region.

A rotational tubular member 50 is sealingly engaged with rigid tubular housing member 22 by means of a sealing ring 52 in a fashion which permits rotation of member 50 with respect to rigid housing member 22 and member 30. Such rotation is normally accomplished by manually turning the knurled portion 54 on the exterior of member 50. A retainer ring 56 also links rigid housing 22 to rotational member 50 and locks member 22 to member 50. Further, member 50 is provided with interior threads which cooperate with threads on the exterior surface of member 30 so that, when member 50 is rotated, member 30 is prevented from rotating by tabs 32, 34 and 36 and instead moves longitudinally, carrying the spray diffuser and valve element 38 with it. The threads on members 30 and 50 are preferably designed so that about two full manual rotations of member 50 will carry the spray diffuser and valve element 38 from its open position as depicted in FIG. 1 to its completely closed position, as shown in FIG. 2, shutting off completely the flow of fluid through nozzle coupling 20.

Thus, the position of the diffuser and valve element 38 shown in FIG. 1, permits fluid flow into coupling 20 past the spider region, and by the diffusing and valve element 38 with substantially no restriction. As the member 38 is moved longitudinally in response to the rotation of member 50 towards the position illustrated in FIG. 2, the shoulder 61 of element 38 approaches stem seal ring 60 and the water flow is restricted and diffused in conventional fashion. Finally, when the shoulder 61 of element 38 engages stem seal ring 60, which serves as a valve seat as shown in FIG. 2, the flow of fluid through the coupling 20 is completely cut off.

In one constructed embodiment of the invention, the minimum area available for the flow of water between shoulder 58 and stem seal 60, with the nozzle coupling 20 in the position shown in FIG. 1, was designed to be the spider region labeled 72 in FIG. 1. In that same embodiment, the area through the orifice 70 was made to be about 0.1503 sq. inches and the available area through the spider region was 0.190 sq. inches. These particular areas were found to result in satisfactory fluid flow through nozzle coupling 20 in the open position when used with a hose having a ⅝ inch internal diameter.

As mentioned briefly above, a swivel-mounted, tubular, male coupling member 76 is preferably provided on the exterior end of rotatable member 50 so that coupling member 76 can be easily connected to any suitable sprinkler, nozzle or other device. In the embodiment of the invention shown in FIGS. 1 and 2, a tubular connecting member 78 is fixed securely to member 50 and serves as a nameplate. A snap ring 80 is provided to hold coupling member 76 in place and an "0" ring 82 is also provided between member 50 and coupling member 76 to prevent leakage between these elements.

FIG. 5 shows a variation of the embodiment of FIG. 1 wherein the rigid housing member 80 is provided with interior threads which engage with the exterior threads of a hose coupling on hose 82 to connect nozzle coupling 84 to hose 82. A washer 86 is also provided between the hose 82 and tubular housing 80. As in the embodiment of the invention illustrated above in FIGS. 1 and 2, a member 88 with a sleeve having longitudinally extending tabs which engage with corresponding grooves in rigid housing member 80 is provided and member 88 connects to a spray diffuser and valve element 90 by any suitable means such as the ribs illustrated in FIGS. 3 and 4. A rotational member 92 has interior threads which engage with exterior threads on member 88 so that when member 92 is manually rotated, member 88 and spray diffuser and valve element 90 move longitudinally to vary the amount of fluid flowing through coupling 84. A male coupling member 94 is provided on the end of the rotating member 94 and is swiveled-mounted as shown for coupling to another sprayer or nozzle in the same fashion as described above.

Many changes and modifications can, of course, be made in the embodiment of the invention illustrated in the above figures without departing from the scope of the invention. Accordingly, that scope is intended to be limited only by the scope of the appended claims.

What is claimed is:
1. A nozzle coupling comprising:
a first tubular member having means adjacent one end thereof for connecting said one end to the end of a hose, having an interior surface bounding an interior cylindrical cavity and having at least one substantially longitudinally extending groove in said interior surface,
a second tubular member having an exterior threaded portion, a sleeve portion extending into said interior cylindrical cavity of said first member an interior surface bounding a roughly cylindrical passageway for fluid flow and at least a single tab on the exterior of said sleeve portion engaging said groove so as to prevent rotational movement of said second member with respect to said first member,
a third tubular member adapted for manual rotation with respect to said first and second members and having an interior threaded portion engaging said exterior threaded portion so that said second member moves longitudinally with respect to said first member when said third member is manually rotated,
valve seat means,
a diffuser and valve element mounted on said second member for movement therewith having a first position bounding a further passageway between said valve seat means and said diffuser and valve element so that fluid flows roughly linearly and substantially unrestricted from said hose through said nozzle coupling via said cylindrical passageway and said further passageway, a second position engaging said seat means preventing the flow of fluid through said nozzle coupling and other positions between said first and second position varying the flow through said coupling, and
a coupling member connected to said third member for connection to another device.

2. A coupling as in claim 1 wherein said connecting means includes a longitudinally extended portion having exterior threads or annular serrations for engagement with the interior of said hose.

3. A coupling as in claim 1 wherein said connecting means includes a longitudinally extended portion having interior threads or annular serrations for engagement with the exterior of said hose.

4. A coupling as in claim 1 wherein said coupling member includes a tubular, swivel mounted male member for engaging threads on said device.

5. A coupling as in claim 1 wherein said valve seat means includes a sealing ring and said element includes a shoulder for engaging said ring to prevent fluid from flowing through said coupling.

6. A coupling as in claim 1 wherein said second member includes a central portion for connecting said element to said second member and a plurality of circumferentially spaced, radially extending ribs connecting said central portion to said sleeve portion so as to define a spider flow region between said ribs through which fluid flows.

7. A coupling as in claim 6 wherein the separation of said element from said valve seat means presents an area no smaller than the spider region to the fluid passing through said coupling when said element is in said open position, said spider region presenting an area of about 0.190 square inches to the fluid passing through said coupling, and said coupling member presenting an area of about 0.150 square inches to the fluid passing through said coupling and wherein said hose has an internal diameter of about ⅝ inch.

* * * * *